United States Patent [19]

Kornylak

[11] 3,857,473
[45] Dec. 31, 1974

[54] POWERED RAIL CONVEYOR

[75] Inventor: Andrew T. Kornylak, Hamilton, Ohio

[73] Assignee: Kornylak Corporation, Hamilton, Ohio

[22] Filed: June 5, 1972

[21] Appl. No.: 259,601

[52] U.S. Cl............. 198/127 R, 74/242.8, 198/208
[51] Int. Cl........................................... B65g 13/07
[58] Field of Search........ 198/127 R, 208; 74/242.8, 74/242.1, 242.12

[56] References Cited
UNITED STATES PATENTS

| | | | |
|---|---|---|---|
| 1,525,363 | 2/1925 | Boyce | 198/208 |
| 2,055,053 | 9/1935 | Stokes | 198/127 R |
| 2,622,721 | 12/1952 | Ferguson | 198/127 R |
| 2,963,918 | 12/1960 | Blakstad | 74/242.8 |
| 2,976,981 | 3/1961 | Peras | 198/127 R |
| 3,011,211 | 12/1961 | Barns | 198/127 R |
| 3,180,480 | 4/1965 | Preston | 198/127 R |
| 3,181,688 | 5/1965 | Schermer | 198/127 R |
| 3,374,877 | 3/1968 | Kornylak | 198/127 R |
| 3,374,878 | 3/1968 | Kornylak | 198/127 R |
| 3,631,963 | 1/1972 | Smith | 198/127 R |

Primary Examiner—Evon C. Blunk
Assistant Examiner—Richard K. Thomson
Attorney, Agent, or Firm—Jay M. Cantor

[57] ABSTRACT

A parallel track conveyor for temporary installation on a floor. Each track consists of aligned standard length rails with power driven rollers for supporting and transporting a pallet. Each rail consists of serially arranged rollers which are driven by a chain and sprocket mechanism and each rail contains a slack adjusting mechanism for adjusting the slack of the chain without requiring shifting of the end rollers of the rail. Only one rail of each track is arranged to be driven from an outside power source.

10 Claims, 8 Drawing Figures

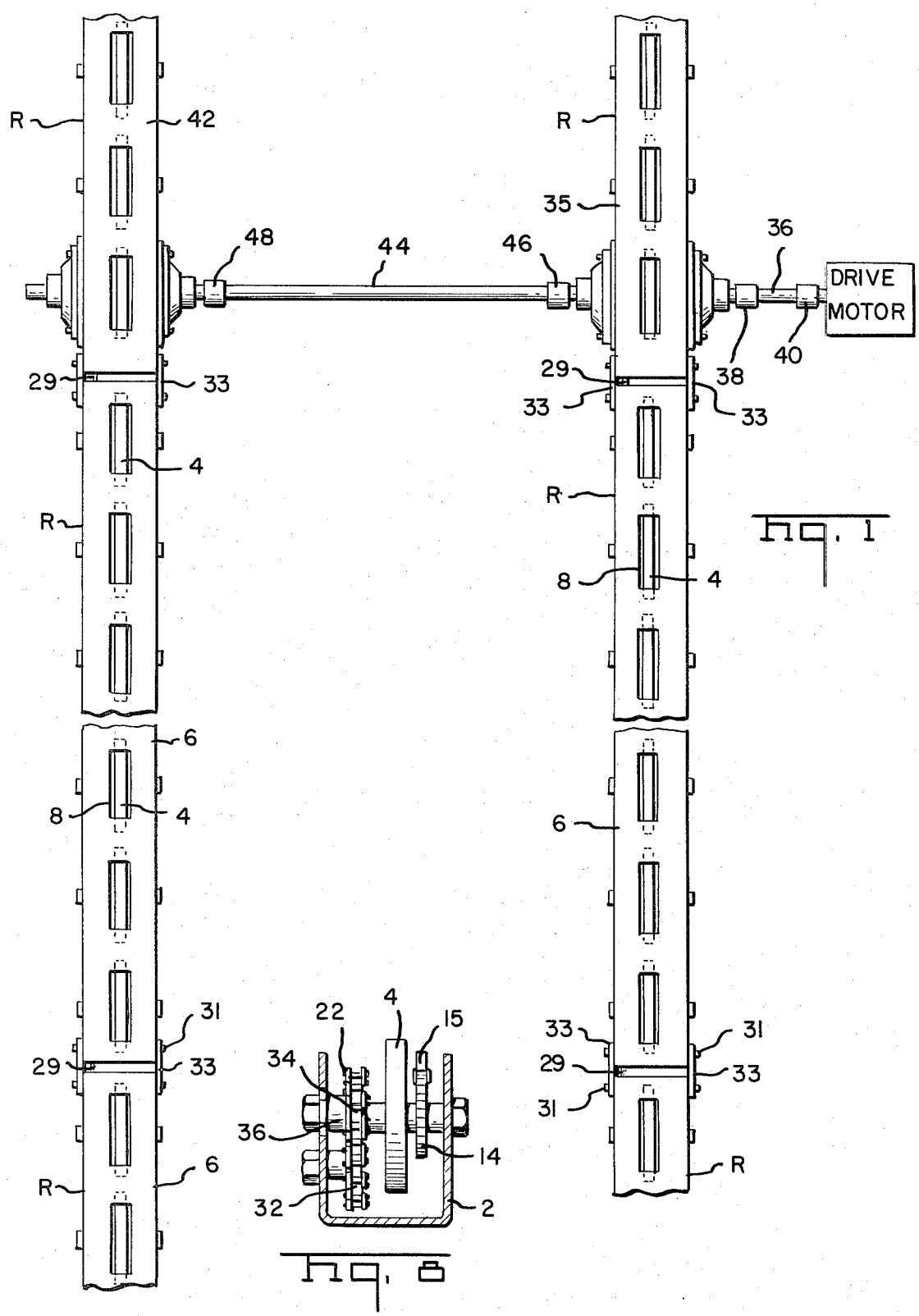

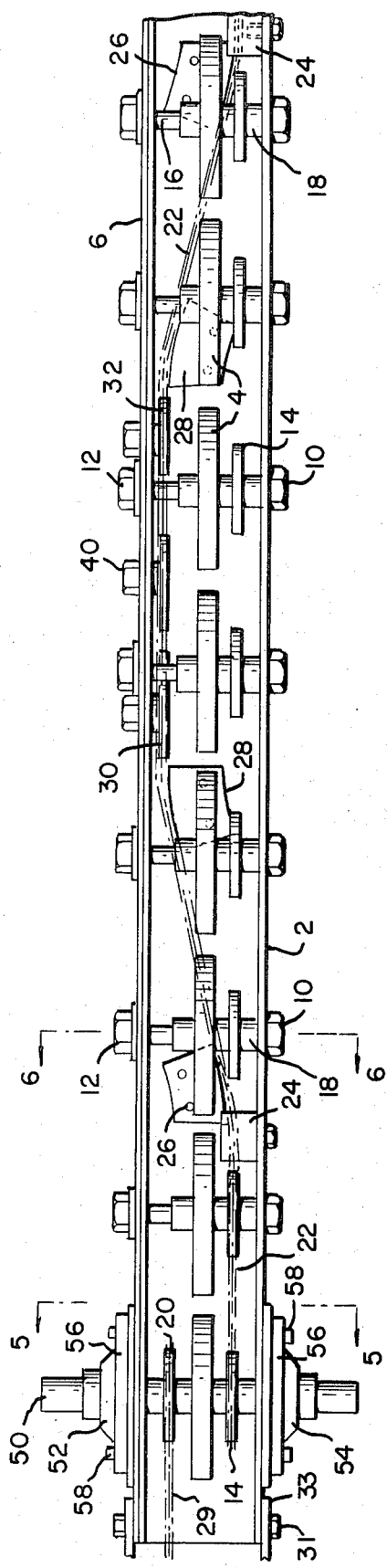

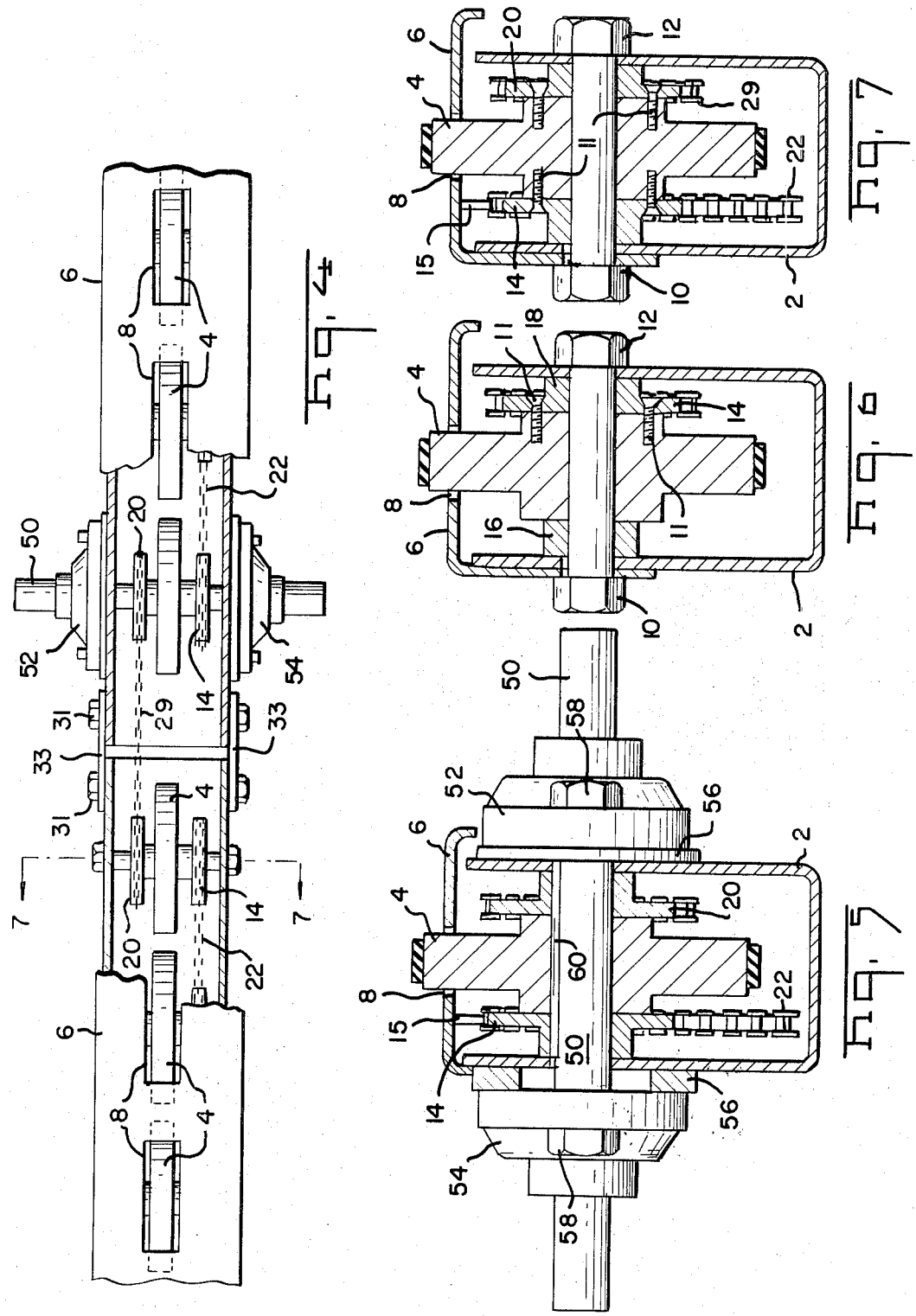

POWERED RAIL CONVEYOR

This invention relates to a conveyor and more particularly to a power rail for conveyors for handling pallets.

It is often necessary to provide a temporary conveyor for moving palletized loads. Sectionalized rollerways each comprising a support mounting a plurality of serially arranged rollers are combined to produce a conveyor of desired length and the rollers are powered to drive the pallets. In cases where the rollers are powered by a chain and sprocket mechanism, the chain and sprocket will wear and, in due course, the chain will become too slack for proper operation. It is therefore necessary to provide for adjustment of the slack. Since it is desired to keep the position of the end rollers fixed in order to allow for easy and rapid assembly of the drive, the mechanism for regulating the proper slack must avoid movement of the end rollers. It is therefore an object of this invention to provide a powered rail for a conveyor in which the slack of the chain can be regulated without movement of the end rollers.

It is a further object of this invention to produce a rail as aforesaid in which at least one of the sprockets can be connected to a source of driving power.

It is a further object of this invention to produce a rail as aforesaid in which at least one of the sprockets can be coupled to an adjacent rail to serve as a source of power therefor.

It is a further object of this invention to produce a rail as aforesaid which can be coupled to a parallel rail to serve as a source of driving power therefor.

These and other objects of the invention will become manifest upon reading the following description in conjunction with the accompanying drawings wherein:

FIG. 1 is a plan view of a conveyor with the power rails of this invention,

FIG. 2 is a partial plan view of a power rail of this invention,

FIG. 3 is a vertical view, partly in section of the power rail,

FIG. 4 is a view, partly in section, of the end coupling of the power rails,

FIG. 5 is a view taken on line 5—5 of FIG. 2,

FIG. 6 is a view taken on the line 6—6 of FIG. 2,

FIG. 7 is a view taken on the line 7—7 of FIG. 4,

FIG. 8 is a view along the line 8—8 of FIG. 3.

In accordance with the invention a conveyor is formed by aligning a plurality of power rails in spaced parallel planes to provide a trackway. Each rail comprises a series of power driven rollers. Power is supplied to at least one roller of the aligned rails and a chain and sprocket mechanism is used to supply power from the powered roller to the other rollers. A chain slack adjustment mechanism is provided in the return run of the chain in each rail to avoid movement of the end rollers of the rail. The fixed position of the end rollers allows the use of standard length rails with a slack adjustment in each rail which can be operated without effecting the spacing of the aligned rails or the slack adjustment of adjacent rails.

With reference to the drawing there is disclosed a power rail R comprising an elongated U shaped channel 2 having a series of rollers 4 rotatably mounted therein. A cover 6 having a plurality of openings 8 for passage of a peripheral portion of the rollers is secured to the channel by nuts and bolts 10, 12. Each bolt 12 also serves as a dead axle for a roller and sprocket 14 rotatably mounted thereon. The roller and sprocket are secured together in driving relation as by screws 11. Spacer 16 and an extended hub 18 of the sprocket position the roller for extension through opening 8. The rollers at the ends of the series have secured thereto a second sprocket 20 which is substituted for the spacer 16. A chain 22 is engaged with the sprockets whereby to simultaneously drive all the sprockets and the rollers secured thereto. Chain guides 15 made of Nylon or Teflon are secured to the cover and fit between the side links of chain 22 to guide the chain along the forward run.

A pair of vertical guides 24 are secured to the same side of the channel adjacent the bottom and near each end and are flanked by a pair of horizontal guides 26 mounted on the bottom of the channel. A second pair of horizontal guides 28 are mounted on the bottom of the channel between guides 26. Guides 24 have the lower surface curved in a manner to smoothly receive the return run of the chain from the end sprocket and to position it parallel to the bottom of the channel. Guides 26 are curved to guide the chain from a plane including the end sprocket toward the opposite wall of the channel. Guide 28 is curved to receive the chain from guide 26 and to guide it parallel to the adjacent wall of the channel. A pair of sprockets 30,32 are rotatably mounted in fixed position on the side of the channel. An adjusting sprocket 34 is rotatably mounted on a dead axle 36' which is shiftable along a slot 38 in the wall of the channel and which can be secured in a selected position in the slot by a nut 40.

In operation the forward run of the chain 22 engages with the tops of the sprockets 14 to drive the rollers 4. The return run of the chain is guided by vertical guide 24 to move close to the bottom of the channel and urged by guides 26 and 28 to move to the opposite side of the channel where it is engaged by sprockets 30,34 and 32. The chain is then guided by guides 28,26, and 24 toward the end sprocket of the series. The guides are preferably formed of Nylon or Teflon. The slack of the chain is adjusted by the positioning of sprocket 34.

The conveyor is formed of a plurality of similar rails R arranged in parallel tracks as illustrated in FIG. 1 which are secured together by plates 33. Each plate is formed with lateral slots S to receive bolts 31 screwed into the side of the channel to permit longitudinal adjustment of the rails to properly tighten chains 29. All the rails of each track but one are constructed as described above. One rail of each track is arranged to receive driving power from a power source. In FIG. 1 the power source is shown as a drive motor connected to one rail 35 by a shaft 36 which is connected to the motor and rail by well known shaft couplings 38,40. Power is transferred to a parallel rail 42 by a shaft 44 connected to the rails by well known shaft couplings 46,48.

The power unit at one end of one of the rails comprises a shaft 50 mounted in bearings (not shown) in housings 52,54. Each housing is secured to a ring 56 by bolts 58. The rings are welded to the sides of the channel. The roller 4 and sprockets 14,20 which are mounted on shaft 50 are secured to the shaft by a key 60.

In assembling the conveyor the rails are aligned as illustrated in FIG. 1 to form a trackway of the desired length. The end bolts 12 forming the dead axles are removed to allow positioning of the chain 29 and are then replaced to complete the assembly. Sprocket 20 which is secured to live axle 50 can be supplied with a permanent chain in order to avoid disassembly. The rails are longitudinally spaced to provide for proper tension of chains 29 and are secured in final position by tightening bolts 31.

While I have shown the use of a chain and sprockets 29,20 to transfer power from one rail to the next it is within the scope of this invention to use gears for this purpose. Each rail has been described as operable by a chain and sprocket mechanism in which the lateral flexibility of the chain is used to provide for shifting of the chain to a slack adjustment station, however, the advantages of the parallel built up trackway can be obtained by using toothed gearing.

Several alternatives to the above described embodiment are clearly apparent. For example, the upper section can be the conveyor body and the cover cam be the bottom face and mounting plate. Also, the chain guides 15 can be made of steel using a continuous straight length of key stock along the full length of the rail. In addition, the drive to the rail can be provided by connecting chain 29 to a motor mounted beyond the end of the rail. Several rails, end to end, can be driven by using the same chain which continues across the rail joints. Furthermore, the take up of chain 22 can be accomplished by moving the end sprocket longitudinally, thereby eliminating the need for sprockets 30, 32 and 34 in their function. Chain slack can also be removed by movement of blocks 15 transverse to the chain.

A further alternative embodiment would be to have a single chain connected to adjacent rolls of adjacent rails. In such an embodiment, each pair of adjacent rails would be driven by a single chain, such as the chain 29 of FIG. 4. However there would be one such chain between each rail section R. Each of these chains extending between rails can also include slack minimizing means of the type described supra. The advantage of such a chain arrangement is that the amount of chain slack between rails can be initially minimized due to the initially short chain lengths.

Though the invention has been described with respect to preferred embodiments thereof, many other variations and modifications will immediately become apparent to those skilled in the art. It is therefore the intention that the appended claims be interpreted as broadly as possible in view of the prior art to include all such variations and modifications.

What is claimed is:

1. A power rail comprising an elongated channel of U shape cross section, a series of rollers rotatably mounted in the channel with the peripheries of the rollers extending above the arms of the U, a sprocket secured to each roller, and an endless chain engaged along one run with the sprockets for simultaneously rotating all the rollers, and means for adjusting the slack in the chain, said means for adjusting comprising means for shifting and guiding at least a portion of the return run of the chain in a plane laterally displaced from and parallel to the plane containing the sprockets, and means for urging a segment of the displaced portion of the chain in said laterally displaced plane to tighten the chain.

2. A power rail as defined in claim 1 further including means for driving one of the sprockets from a source of power independent of the chain.

3. A power rail as defined in claim 2 further including means for taking power from one of the sprockets.

4. A power rail as defined in claim 3 wherein the means for taking power from one of the sprockets comprises a second sprocket mounted coaxially with the sprocket secured to an end one of the series of rollers.

5. A power rail as defined in claim 4 further including a second sprocket mounted coaxially with the other end one of the series of rollers.

6. A power rail as defined in claim 3 wherein the means for taking power from one of the sprockets comprises a coupling secured to the said sprocket and means for engaging a power take off shaft with the coupling.

7. A power rail as defined in claim 1 further including a cover secured over the U, and aligned openings in the cover for extension therethrough of the said peripheries.

8. A power rail as defined in claim 7 further including a hold down guide for the chain secured to the cover.

9. A power rail as defined in claim 8 wherein the hold down guide comprises a rib extending between the side edges of the chain.

10. A power rail as defined in claim 9 wherein the hold down guide is formed of Nylon.

* * * * *